Aug. 26, 1952  G. R. WOOD  2,607,950
MEAT TENDERIZING MACHINE
Filed April 11, 1946  3 Sheets-Sheet 1
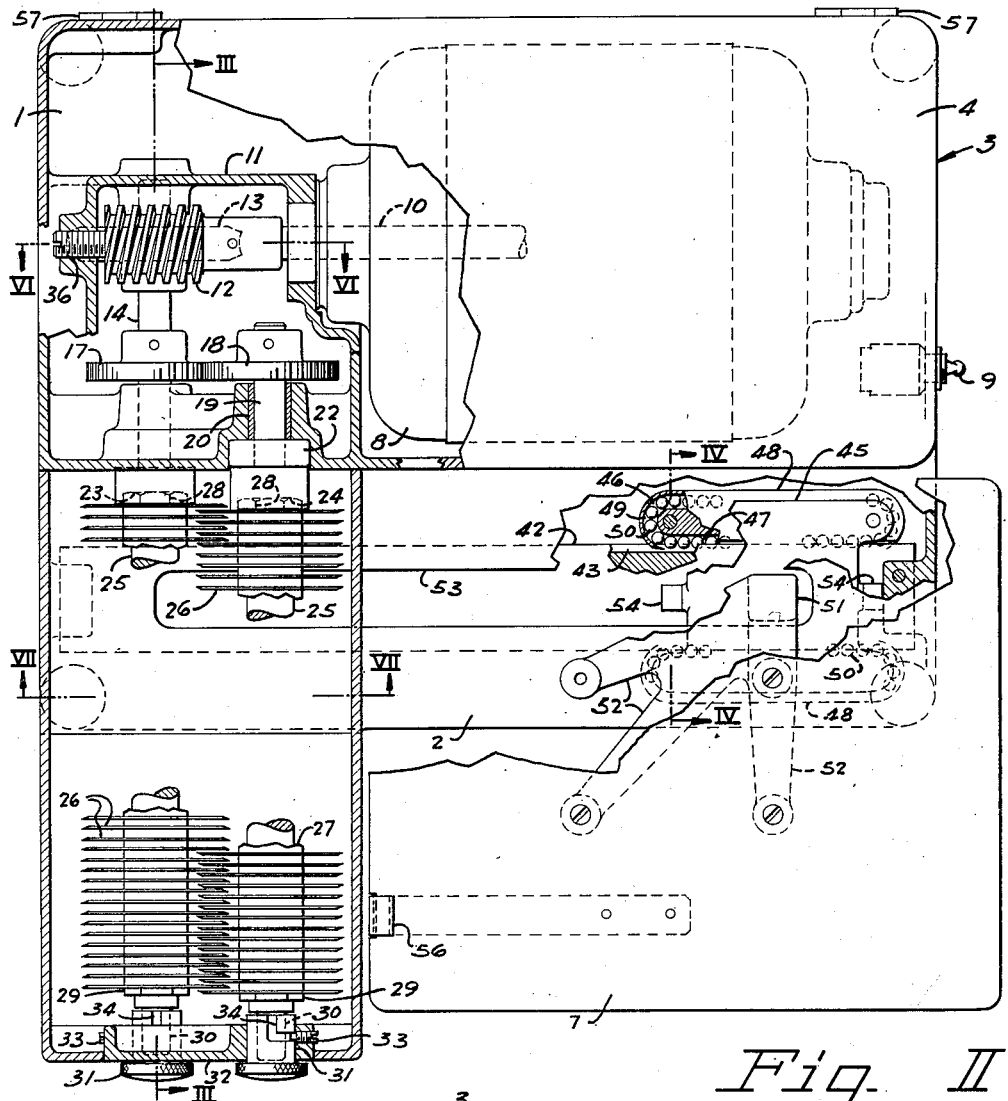
*Fig. II*
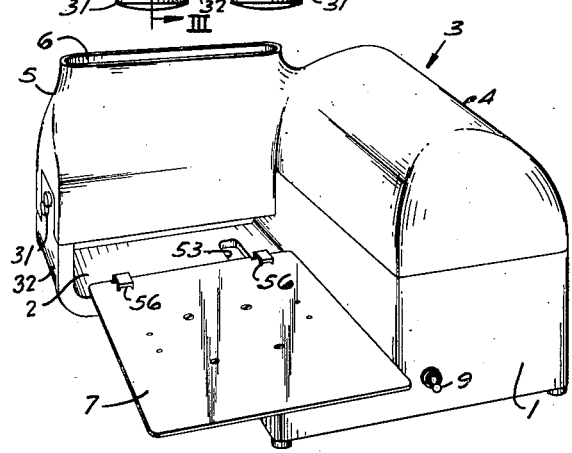
*Fig. I*
INVENTOR.
George R. Wood
BY
Marshall & Marshall
ATTORNEYS

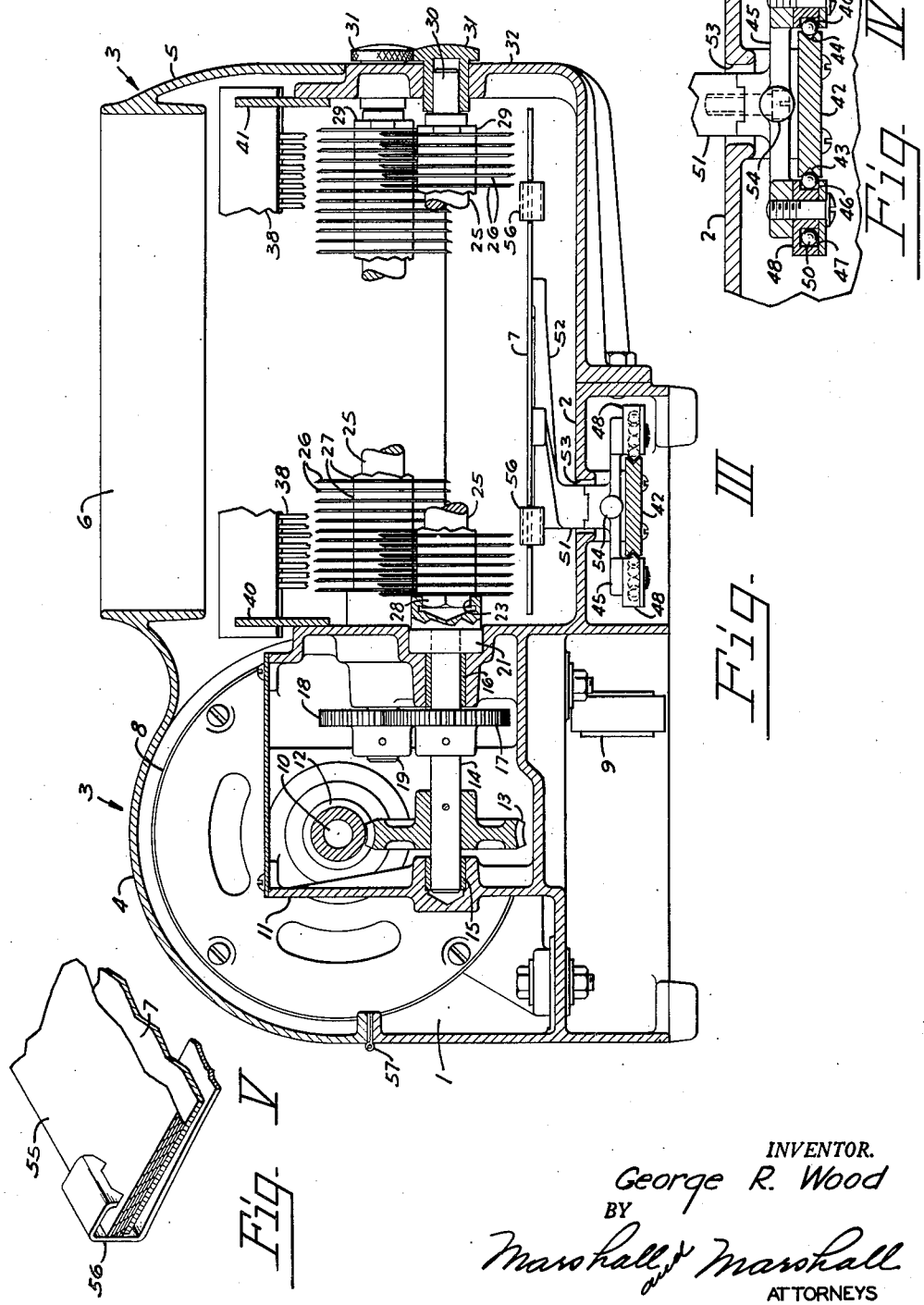

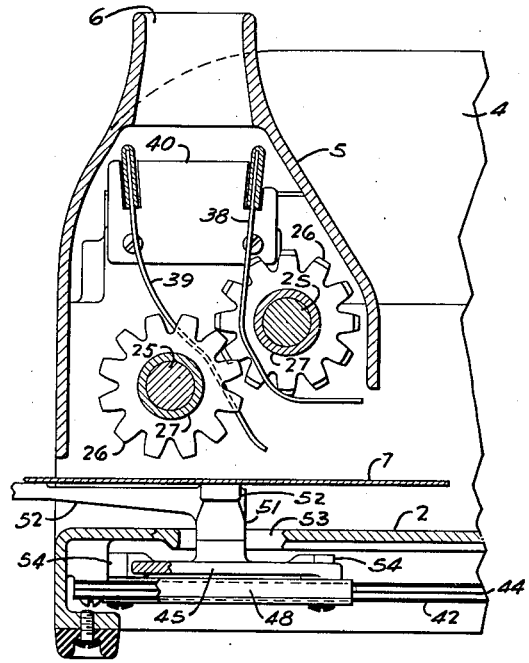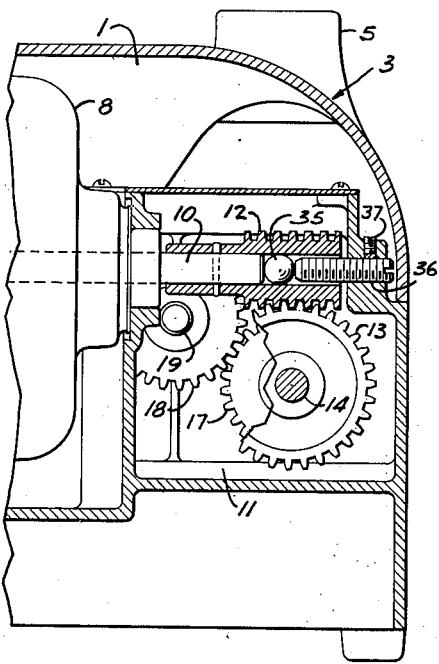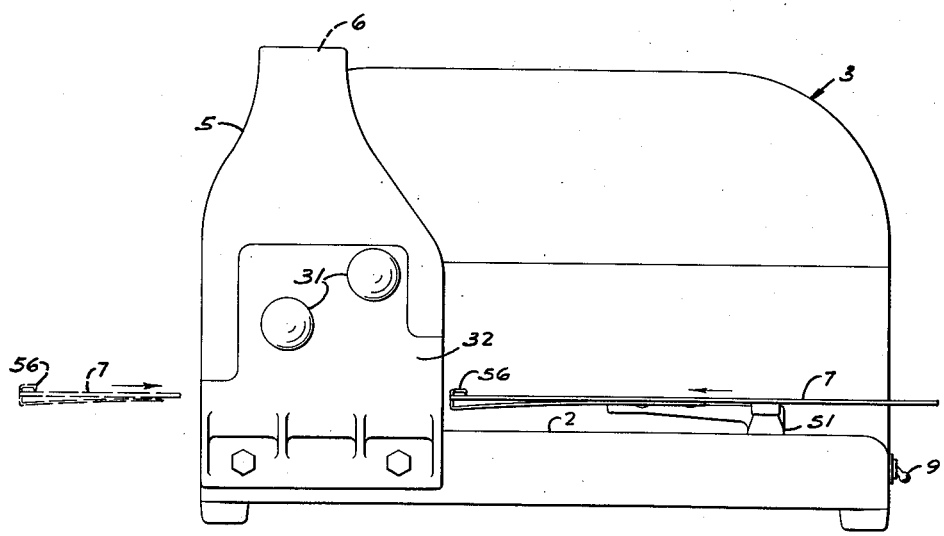

Patented Aug. 26, 1952

2,607,950

UNITED STATES PATENT OFFICE 2,607,950

MEAT TENDERIZING MACHINE

George Rue Wood, Toledo, Ohio, assignor to Toledo Scale Company, Toledo, Ohio, a corporation of New Jersey Application April 11, 1946, Serial No. 661,445

3 Claims. (Cl. 17—26)

This invention relates to meat tenderizing machines and in particular to an improved arrangement of the parts of a tenderizing machine, the improved arrangement contributing to greater ease of operation.

When operating an ordinary meat tenderizing machine the operator must catch the meat as it leaves the tenderizing rolls and spread it out on a display tray or sheet of paper. This is usually inconvenient because the operator's attention is devoted to feeding the meat into the machine and to watching for pieces of bone which would damage the machine.

The principal object of this invention is to provide a meat tenderizing machine having a reciprocable paper-covered tray adapted to receive the meat as it leaves the tenderizing rolls.

Another object of the invention is to provide in a meat tenderizing machine employing a gear drive between the motor and the rolls in which the drive gears are constantly supplied with lubricant.

A still further object of the invention is to provide a meat tenderizing machine which is compact and in which all of the mechanism is readily accessible for servicing.

These and other objects and advantages are apparent from the following description of a meat tenderizing machine embodying the invention.

The improved meat tenderizing machine is illustrated in the accompanying drawings, in which:

Figure I is a perspective view of the machine as seen from the operator's side.

Figure II is an enlarged plan view, with parts broken away and other parts shown in section, of the improved meat tenderizing machine.

Figure III is a vertical section taken substantially along the line III—III of Figure II.

Figure IV is a fragmentary view at an enlarged scale of the bearing for the reciprocable table as seen from the line IV—IV of Figure II.

Figure V is a fragmentary perspective view of one of the paper clamps.

Figure VI is a fragmentary vertical section taken substantially along the line VI—VI of Figure II.

Figure VII is a fragmentary vertical section taken substantially along the line VII—VII of Figure II.

Figure VIII is a side elevation of the tenderizing machine illustrating the relationship of the reciprocable slide with respect to the housing of the machine.

These specific figures and the accompanying description are intended merely to illustrate the invention but not to impose limitations on the claims.

The improved meat tenderizing machine is contained within a generally L-shaped housing having a motor containing compartment 1, a shelf 2 extending along the side of the motor compartment 1 and transversely thereto near one of its ends. A cover 3 having a semicylindrical portion 4 overlying the motor compartment 1 and a roof-shaped portion 5 overlying the transverse portion of the shelf 2 completes the enclosure. Meat to be tenderized is inserted through a slot 6 extending along the ridge of the roof-shaped portion 5 of the cover 3, is tenderized by knife-bearing arbors and is dropped onto a reciprocably mounted tray 7 which carries the meat forward to a position convenient to the operator.

A driving motor 8 controlled by a switch 9 is mounted in the motor compartment 1 with its armature shaft 10 extending into a gear box 11 constructed integrally within the end of the motor compartment 1. The motor shaft 10 carries a worm 12 meshing with a worm wheel 13 pinned to a cross shaft 14 which shaft is journaled in bearings 15 and 16 formed in the side walls of the gear box 11.

A spur gear 17 pinned to the cross shaft 14 meshes with a similar spur gear 18 pinned onto the end of a short shaft 19 journaled in a bearing 20. The shafts 14 and 19 extending through the side wall of the gear box 11 are provided with oil seals 21 and 22 and have their external ends machined to form relatively large hexagonal sockets 23 and 24.

A pair of meat tenderizing rolls each consisting of an arbor 25 carrying a plurality of toothed knife disks 26 spaced along the arbor by washers 27 and clamped on the arbor 25 between a hexagonal head 28 and a nut 29 are located in the space immediately beneath the roof-shaped portion 5 of the cover 3. The hexagonal heads 28 of the arbors fit into the hexagonal sockets 23 and 24 while tenons 30 extending from the other ends of the arbors are journaled in removable bearings 31 fitted in an upstanding portion 32 of the shelf 2. The removable bearings 31 are held in place by the engagement of the tips of set screws 33 with L-shaped grooves 34 cut in the external cylindrical surface of the bearings 31. The directions of the short end of the L-shaped grooves 34 are such that the normal rotation of the arbors 25 tends to hold the bearings securely in place. The tenderizing rolls may be removed for cleaning by rotating the removable bearings 31 against the direction of the normal arbor rotation, withdrawing the bearings, then disengaging the hexagonal heads 28 from the sockets and lifting out the rolls. The rolls are assembled by reversing the order of the operations. The short shaft 19 with its socket 24 protrudes axially from the gear box 11 further than the shaft 14 to offset the knives of one arbor from the other and permit their intermeshing.

The end thrust applied to the motor shaft 10 by the worm 12 and worm wheel 13 is carried by a hardened steel ball 35 located within the bore of the worm 12 and pressed against the end of the armature shaft 10 by a flat-ended screw 36 threaded through the end wall of the gear box 11 and locked in place by a set screw 37.

Inasmuch as the armature shaft 10, the cross shaft 14 and the short shaft 19 each have an oil seal it is practical to provide oil bath lubrication for the gears.

Meat that is dropped through the slot 6 is guided through a chute formed between a front comb 38 and a rear comb 39 which chute extends between the arbors 25 so that the meat is passed between and tenderized by the tenderizing rolls and then is stripped from the rolls by the lower ends of the combs. The combs are supported from notched plates 40 and 41 screwed or otherwise secured to the housing at points above the ends of the arbors. Teeth of the rear comb 39, the comb engaged by the left one of the tenderizing rolls, as seen in Figures II or VII, extends generally downwardly and forwardly with the lower end of the teeth directed toward the front of the machine. The teeth of the front comb 38 extend straight down to the level of the front tenderizing roll then they sweep forward and downward so that they pass the peripheries of the teeth at a point generally below the arbor and thence extend forward horizontally. As the meat which is dropped through the slot 6 slides down between the combs it is caught by the knives and tenderized. As it emerges from the space between the rolls the rear comb strips it from the rear roll and presses it against the front roll. A short time later the generally horizontal portion of the front comb 38, aided by gravity, strips the meat from the front roll so that it drops free and clear onto the tray 7. The teeth of the front comb 38, that comb last acting on the meat, must be sufficiently long so that strings of sinew which might be drawn between the teeth cannot lift the tenderized meat and wrap it around the roll.

The tray 7 passes closely below the tenderizing rolls so that the tenderized meat as it is discharged forwardly by the action of the tenderizing rolls pushes the tray 7 forwardly so that the tenderized meat is delivered to an open, easily accessible location. In order that this type of operation may be successful it is necessary that the tray move with a minimum of friction. The tray 7 is supported from a bar 42 located beneath the shelf 2 and parallel to the path of the tray 7. The bar has V grooves 43 and 44 forming tracks along its sides extending its full length. A carriage 45 carrying the tray 7 has ball bearing raceways 46 and 47 cut in elongated blocks 48 attached to the carriage 45 and lying alongside the bar 42. The raceways 46, juxtaposed to the V grooves 43 and 44 of the bar 42, are rectangular in cross section with their width horizontally slightly greater than half of their height. The raceways 47 are square in cross section. The raceways 46 and 47 at each end of the elongated block 48 are connected by semi-circular raceways 49 so that a continuous track is formed for a series of steel bearing balls 50. During the working part of their travel the bearing balls 50 are confined within the raceways formed by the V grooves 43 and 44 and the opposed tracks 46. As the carriage 45 rolls along the bar 42 the bearing balls 50 roll along their respective tracks so as to maintain essentially friction-free support for the carriage 45.

A bracket 51, rigidly secured to the carriage 45 and having a plurality of laterally extending arms 52 for supporting the tray 7, extends upwardly through a slot 53 cut in the shelf 2 parallel to the sides of the motor compartment 1.

The carriage 45 is provided with a pair of oppositely directed rubber bumpers 54 adapted to cushion the carriage as it reaches either end of its stroke.

For convenience in handling the tenderized meat, the tray 7 is covered with a pad of paper 55 (Figure V) held in place by spring clips 56 riveted to the underside of the tray and extending up and around its rear edge. In operation a stack or pad of paper is engaged under the clips 56 and one sheet is removed with each piece of tenderized meat. In normal use the tray 7 is pushed to the back end of its stroke, the position indicated by the broken lines in Figure VIII, before the meat is dropped into the machine. The tenderized meat, as it is discharged from the tenderizing rollers pushes the tray forward with sufficient force to drive it to the position shown in solid lines in Figure VIII. The operator then lifts the top sheet of paper from the tray taking with it the slice of tenderized meat.

Compared with ordinary tenderizing machines the improved tenderizer is easy to use because the operator need not catch the tenderized meat as it is discharged from the rolls. But more than this, the improved tenderizing machine offers other advantages. The cover 3 which is attached to the motor compartment 1 by hinges 57 when closed completely covers all of the operating mechanism. Yet when it is opened to give access to the tenderizing rolls it also gives access to the motor 8 and the gear box 11 so that maintenance of these units is facilitated. The general arrangement of the tenderizer permits a very compact gear transmission to be used which, having oil bath lubrication, contributes materially to its unusually quiet operation.

While the described meat tenderizing machine illustrates the preferred form of the invention it is apparent that modifications may be made in various aspects of its design without losing the advantages of the invention and that therefore the described embodiment should be considered as merely illustrative and not as defining the scope of the invention.

Having described the invention, I claim:

1. In a machine for tenderizing meat, in combination, a generally L-shaped frame, a pair of knife carrying arbors journaled in a first arm of the L-shaped frame, said arbors being parallel and spaced so that the knives interdigitate, said arbors being spaced vertically so that meat tenderized thereby is discharged along an inclined path toward the space between the arms of the L-shaped frame, a track mounted on and extending along a second arm of the frame, a tray that is mounted on and movable along the track and passes closely adjacent the lower of the pair of arbors, said tray being adapted to be manually positioned to one end of its travel and to be driven by the tenderized meat toward the other end of its travel.

2. In a machine for tenderizing meat, in combination, a pair of arbors each carrying a plurality of knives that interdigitate with the knives of the other arbor, one of said arbors being displaced vertically and laterally of the other such that the discharge path of the tenderized meat is inclined downwardly, a track extending in a horizontal direction beneath the arbors and along the discharge path, a tray mounted on and freely movable along the track and adapted to pass directly beneath the arbors to catch the tenderized meat, said tray being driven along the track by the meat leaving the arbors.

3. In a machine for tenderizing meat, in combination, a pair of horizontal motor-driven knife-bearing arbors, one of the arbors being displaced vertically and horizontally from the other such that the discharge path of the tenderized meat is inclined downwardly, a track that extends horizontally below and generally perpendicular to the arbors, a tray mounted to move back and forth along the track from a first position beneath and close to the arbors to a second position clear of the arbors, said tray being adapted to be driven from the first to the second position by tenderized meat discharged by the arbors.

GEORGE RUE WOOD.

REFERENCES CITED

The following references are of record in the file of this patent:

UNITED STATES PATENTS

| Number | Name | Date |
|---|---|---|
| 519,209 | Van Eyck | May 1, 1894 |
| 880,589 | Snelling | Mar. 3, 1908 |
| 1,310,262 | Van Berkel | July 15, 1919 |
| 1,801,309 | Gipe | Apr. 21, 1931 |
| 1,837,607 | Biggert, Jr. | Dec. 22, 1931 |
| 1,976,863 | Van Berkel | Oct. 16, 1934 |
| 2,051,207 | Ferry | Aug. 18, 1936 |
| 2,242,935 | Ahrndt | May 20, 1941 |
| 2,409,463 | Ahrndt | Oct. 15, 1946 |
| 2,420,549 | McKee et al. | May 13, 1947 |